(12) United States Patent
Yoshinaga et al.

(10) Patent No.: US 12,725,524 B2
(45) Date of Patent: Sep. 1, 2026

(54) TRAVEL ASSISTANCE DEVICE AND SADDLE RIDING VEHICLE

(71) Applicant: HONDA MOTOR CO., LTD., Tokyo (JP)

(72) Inventors: Masao Yoshinaga, Tokyo (JP); Chikashi Iizuka, Tokyo (JP); Keisuke Ohara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 18/891,365

(22) Filed: Sep. 20, 2024

(65) Prior Publication Data

US 2025/0108824 A1 Apr. 3, 2025

(30) Foreign Application Priority Data

Sep. 28, 2023 (JP) ................................. 2023-168774

(51) Int. Cl.
*G08G 1/16* (2006.01)
*B60W 50/14* (2020.01)

(52) U.S. Cl.
CPC ............. *G08G 1/167* (2013.01); *B60W 50/14* (2013.01); *G08G 1/16* (2013.01); *G08G 1/166* (2013.01); *B60W 2554/4041* (2020.02)

(58) Field of Classification Search
CPC .......... G08G 1/16; G08G 1/166; G08G 1/167; B62J 6/00; B60K 35/00; B60R 1/00; B60Q 1/00; B60W 50/14; B60W 50/143; B60W 50/146
See application file for complete search history.

(56) References Cited

U.S. PATENT DOCUMENTS 9,153,133 B1 10/2015 Lunsford
2010/0073152 A1 3/2010 Nagamine et al.
2017/0106750 A1* 4/2017 Tauchi ...................... B60R 1/27
2017/0294127 A1 10/2017 Nakatani et al.
2019/0073540 A1 3/2019 Yamada et al.
(Continued)

FOREIGN PATENT DOCUMENTS

JP 2003-118523 A 4/2003
JP 2008-162553 A 7/2008
JP 2010-73134 A 4/2010
(Continued)

OTHER PUBLICATIONS

Japanese Office Action dated May 20, 2025 issued in corresponding Japanese application No. 2023-168774; English translation included (10 pages).

(Continued)

*Primary Examiner* — Van T Trieu
(74) *Attorney, Agent, or Firm* — Rankin, Hill & Clark LLP

(57) ABSTRACT

A travel assistance device includes: a detection range element setting unit that sets a plurality of detection range elements aligned in a width direction in a region along sides toward a rear of a host vehicle; an object detection unit that detects presence or absence of an object for each of width positions corresponding to the detection range elements; and a notification unit that notifies the presence of the object when the object is determined to be an object to be notified on the basis of detection results of the object detection unit.

6 Claims, 9 Drawing Sheets

(56) References Cited

U.S. PATENT DOCUMENTS

| | | | | |
|---|---|---|---|---|
| 2019/0088137 | A1 | 3/2019 | Yamada et al. | |
| 2020/0282908 | A1* | 9/2020 | Xu | B60R 11/04 |

FOREIGN PATENT DOCUMENTS

| | | | |
|---|---|---|---|
| JP | 2017-522681 | A | 8/2017 |
| JP | 2019-49774 | A | 3/2019 |
| JP | 2019-53574 | A | 4/2019 |
| WO | 2016/035215 | A1 | 3/2016 |

OTHER PUBLICATIONS

Japanese Office Action Corresponding to JP Application No. 2023-168774, dated Sep. 2, 2025, 4 pages.

Indonesian Office Action dated Apr. 9, 2026 issued in corresponding Indonesian application No. P-00202409449; English translation included (5 pages).

* cited by examiner

FIG. 1

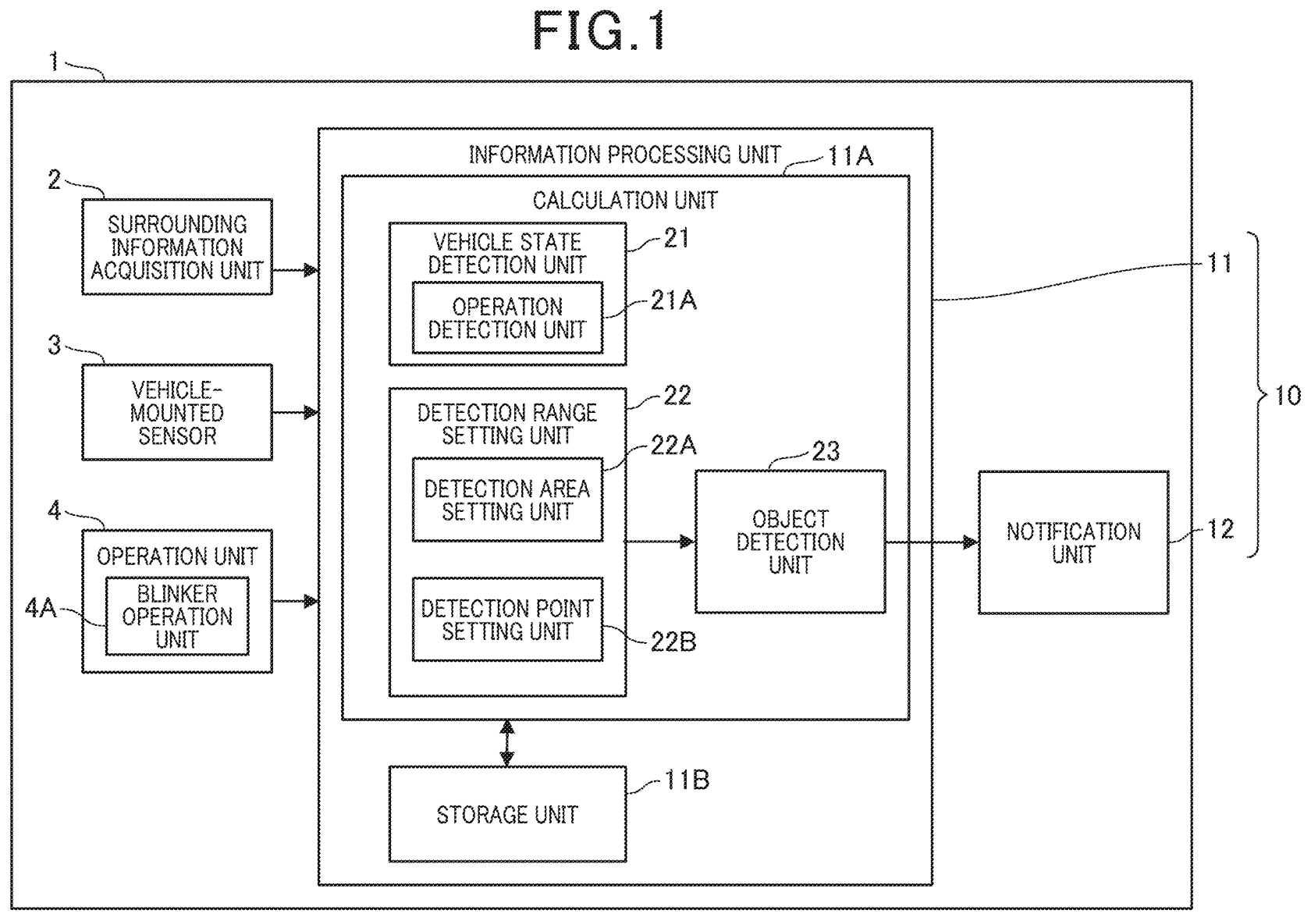

1
2
SURROUNDING INFORMATION ACQUISITION UNIT
3
VEHICLE-MOUNTED SENSOR
4
OPERATION UNIT
4A
BLINKER OPERATION UNIT
INFORMATION PROCESSING UNIT
11A
CALCULATION UNIT
VEHICLE STATE DETECTION UNIT
21
OPERATION DETECTION UNIT
21A
DETECTION RANGE SETTING UNIT
22
DETECTION AREA SETTING UNIT
22A
DETECTION POINT SETTING UNIT
22B
23
OBJECT DETECTION UNIT
STORAGE UNIT
11B
11
10
NOTIFICATION UNIT
12

FIG.7

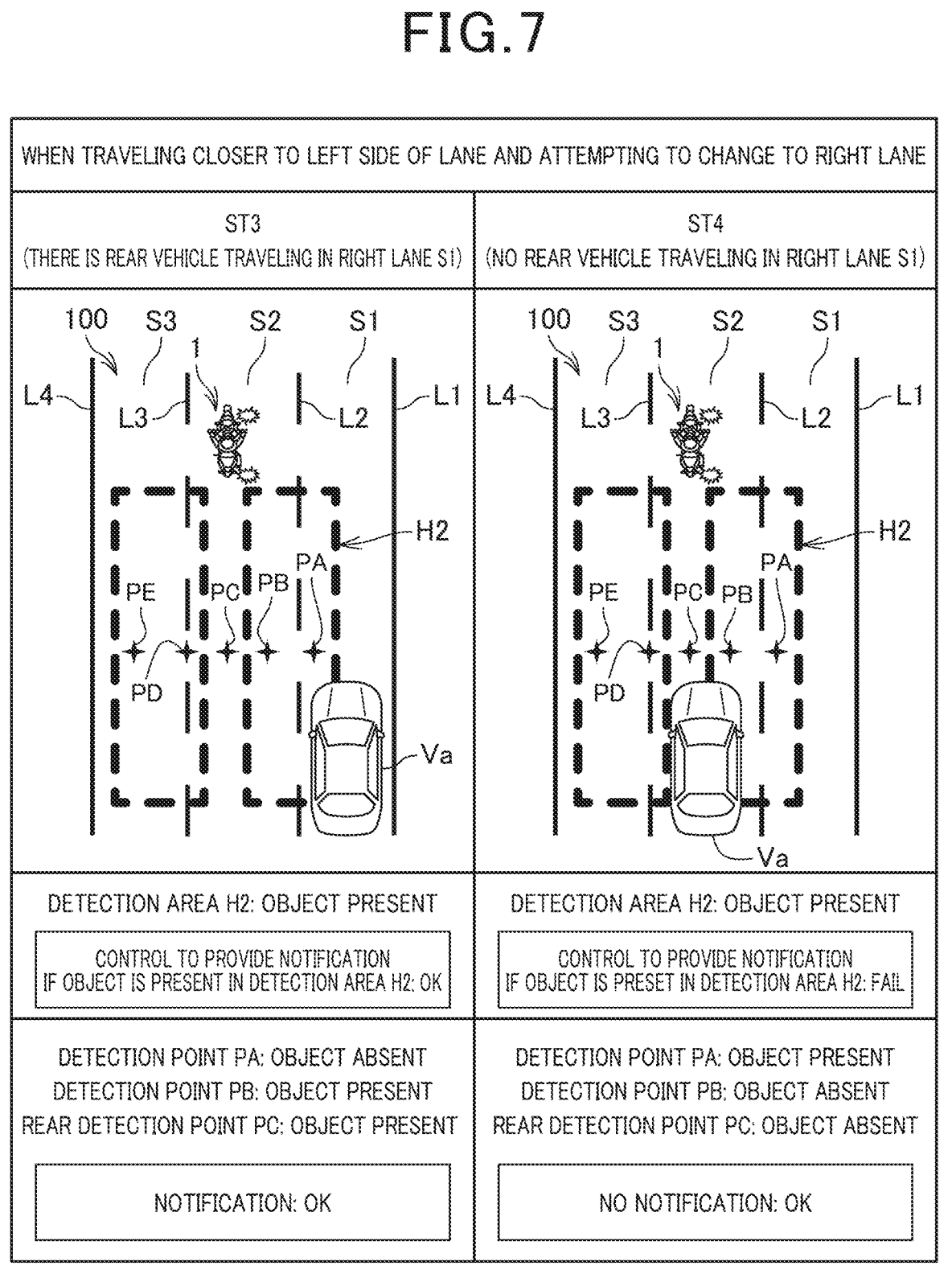

| WHEN TRAVELING CLOSER TO LEFT SIDE OF LANE AND ATTEMPTING TO CHANGE TO RIGHT LANE | |
|---|---|
| ST3 (THERE IS REAR VEHICLE TRAVELING IN RIGHT LANE S1) | ST4 (NO REAR VEHICLE TRAVELING IN RIGHT LANE S1) |
| 100, S3, S2, S1, 1, L4, L3, L2, L1, H2, PA, PB, PC, PD, PE, Va | 100, S3, S2, S1, 1, L4, L3, L2, L1, H2, PA, PB, PC, PD, PE, Va |
| DETECTION AREA H2: OBJECT PRESENT<br>CONTROL TO PROVIDE NOTIFICATION IF OBJECT IS PRESENT IN DETECTION AREA H2: OK | DETECTION AREA H2: OBJECT PRESENT<br>CONTROL TO PROVIDE NOTIFICATION IF OBJECT IS PRESET IN DETECTION AREA H2: FAIL |
| DETECTION POINT PA: OBJECT ABSENT<br>DETECTION POINT PB: OBJECT PRESENT<br>REAR DETECTION POINT PC: OBJECT PRESENT<br>NOTIFICATION: OK | DETECTION POINT PA: OBJECT PRESENT<br>DETECTION POINT PB: OBJECT ABSENT<br>REAR DETECTION POINT PC: OBJECT ABSENT<br>NO NOTIFICATION: OK |

FIG.8

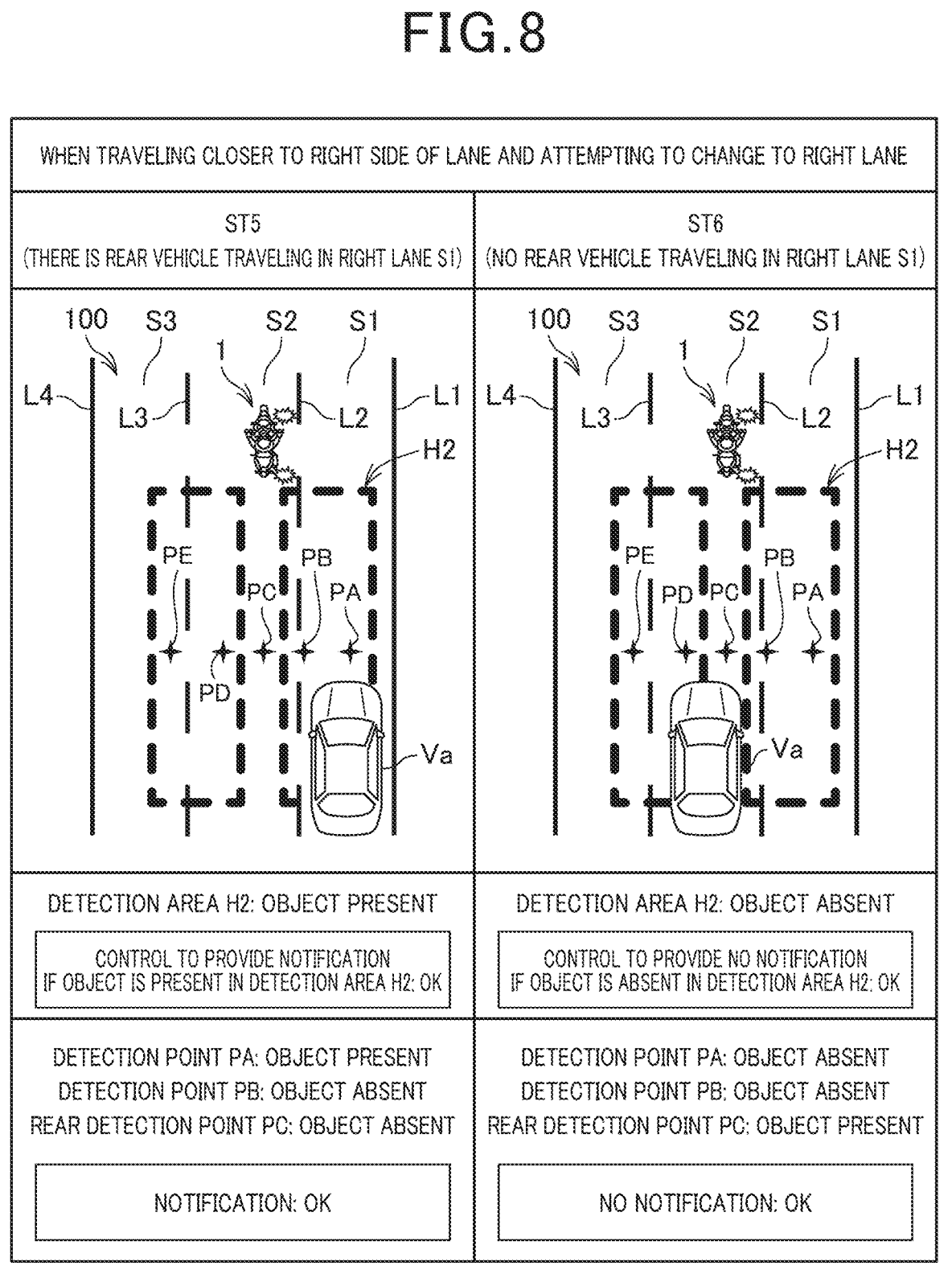

| WHEN TRAVELING CLOSER TO RIGHT SIDE OF LANE AND ATTEMPTING TO CHANGE TO RIGHT LANE | |
|---|---|
| ST5<br>(THERE IS REAR VEHICLE TRAVELING IN RIGHT LANE S1) | ST6<br>(NO REAR VEHICLE TRAVELING IN RIGHT LANE S1) |
| 100 S3 S2 S1 1 L4 L3 L2 L1 H2 PE PB PC PA PD Va | 100 S3 S2 S1 1 L4 L3 L2 L1 H2 PE PB PD PC PA Va |
| DETECTION AREA H2: OBJECT PRESENT<br>CONTROL TO PROVIDE NOTIFICATION IF OBJECT IS PRESENT IN DETECTION AREA H2: OK | DETECTION AREA H2: OBJECT ABSENT<br>CONTROL TO PROVIDE NO NOTIFICATION IF OBJECT IS ABSENT IN DETECTION AREA H2: OK |
| DETECTION POINT PA: OBJECT PRESENT<br>DETECTION POINT PB: OBJECT ABSENT<br>REAR DETECTION POINT PC: OBJECT ABSENT<br>NOTIFICATION: OK | DETECTION POINT PA: OBJECT ABSENT<br>DETECTION POINT PB: OBJECT ABSENT<br>REAR DETECTION POINT PC: OBJECT PRESENT<br>NO NOTIFICATION: OK |

TRAVEL ASSISTANCE DEVICE AND SADDLE RIDING VEHICLE

INCORPORATION BY REFERENCE

The present application claims priority under 35 U.S.C. § 119 to Japanese Patent Application No. 2023-168774 filed on Sep. 28, 2023. The content of the application is incorporated herein by reference in its entirety.

TECHNICAL FIELD

The present invention relates to a travel assistance device and a saddle riding vehicle.

BACKGROUND ART

In recent years, there is known a system for four-wheeled vehicles that detects another vehicle in a region along the sides toward a rear of a host vehicle, the region tending to be a blind spot, and that alerts the driver of the host vehicle. Similar blind spot monitoring systems have been considered for saddle riding vehicles such as motorcycles (for example, Patent Literature 1). The technology disclosed in Patent Literature 1 identifies the relative position of a vehicle in an adjacent lane on the basis of the inclination of a motorcycle, and notifies the user of the presence of a vehicle in the user's blind spot when the user changes lanes, for example.

CITATION LIST

Patent Literature

[Patent Literature 1] Japanese Unexamined Patent Application Publication (Translation of PCT Application) No. 2017-522681

SUMMARY OF INVENTION

Technical Problem

By the way, compared to large vehicles, relatively small vehicles such as motorcycles can take various travel positions in the width direction, even within the same lane.

In conventional blind spot monitoring systems, when a host vehicle such as a motorcycle moves closer to the left or right in the same lane, the rider of the host vehicle is notified of the presence of a rear vehicle traveling in the same lane, which may lead to excessive notification.

The present invention has been made in view of the above-mentioned circumstances and an object of the present invention is to suppress excessive notification.

Solution to Problem

A travel assistance device is provided that includes: a detection range element setting unit that sets a plurality of detection range elements aligned in a width direction in a region along sides toward a rear of a host vehicle; an object detection unit that detects presence or absence of an object for each of width positions corresponding to the detection range elements; and a notification unit that notifies the presence of the object when the object is determined to be an object to be notified on the basis of detection results of the object detection unit.

A saddle riding vehicle is provided that includes: the travel assistance device; and an operation unit that receives an operation intended for lane changing, and in the saddle riding vehicle, the detection range element setting unit sets the detection range elements when the operation unit is operated.

Advantageous Effects of Invention

It is possible to suppress excessive notification.

BRIEF DESCRIPTION OF DRAWINGS

FIG. 1 is a block diagram illustrating a travel assistance device according to an embodiment of the present invention together with its peripheral configuration.

FIG. 7 is a view providing the explanation of the processing of steps SP2 to SP4 in FIG. 5.

FIG. 8 is a view providing an explanation of the processing of steps SP2 to SP4 in FIG. 5.

DESCRIPTION OF EMBODIMENTS

Figure 2:
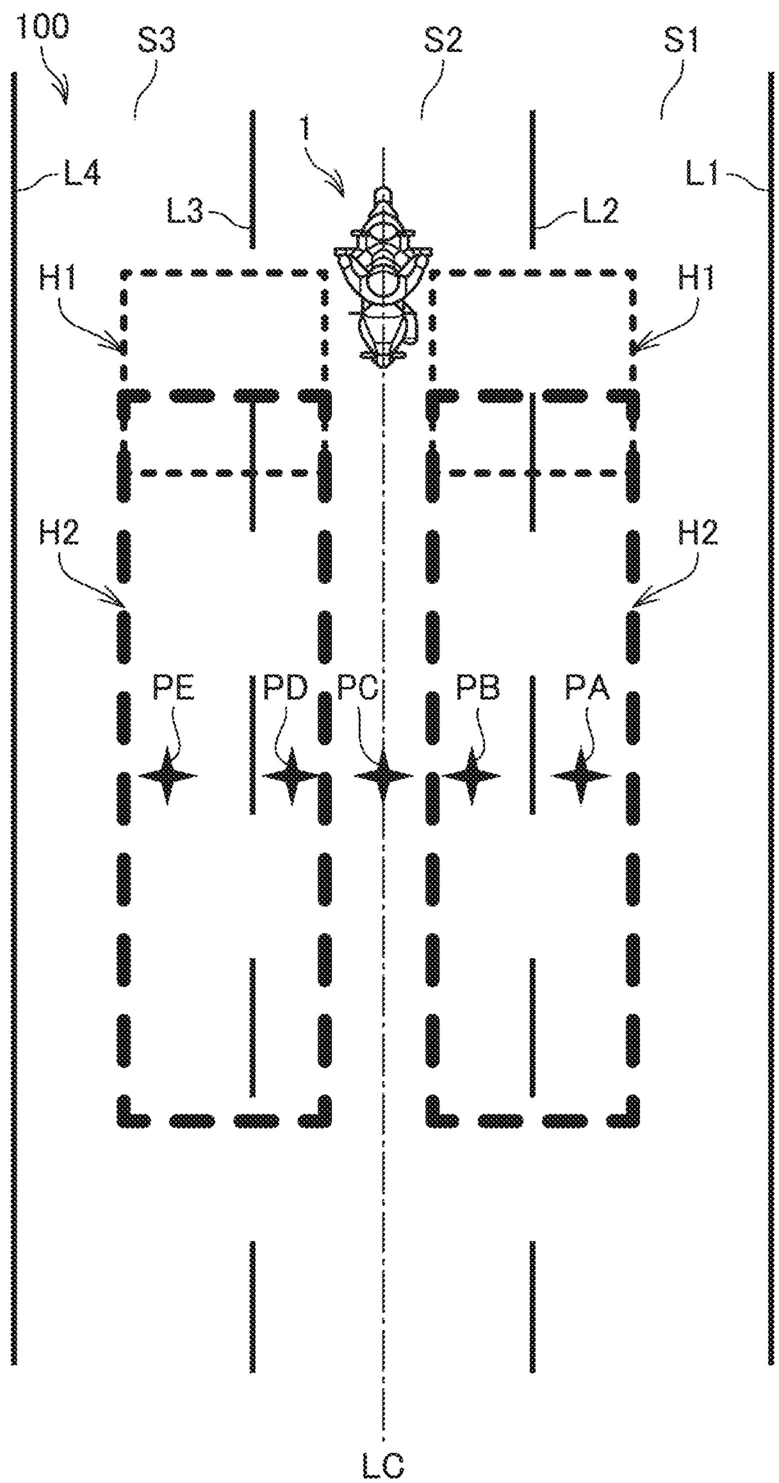
FIG. 2 schematically illustrates detection areas and detection points.

The following describes an embodiment of the present invention with reference to the drawings.

FIG. 1 is a block diagram illustrating a travel assistance device 10 according to an embodiment of the present invention together with its peripheral configuration. The travel assistance device 10 is a device that is installed in a vehicle 1, and is one of the devices that detects an object corresponding to another vehicle around the vehicle 1 and notifies the detection result. The other vehicle to be detected is a vehicle located in a position that tends to be a blind spot during travel.

In other words, the travel assistance device 10 has a blind spot information (BSI) function that notifies the driver (rider) of the vehicle 1 of the presence of another vehicle in a position that tends to be a blind spot during travel. Therefore, the travel assistance device 10 can also be referred to as a driving assistance device, a blind spot monitoring device, a vehicle-mounted device, or the like.

In the present embodiment, the vehicle 1 is a motorcycle, and another vehicle to be detected is any vehicle, including a four-wheeled vehicle and a motorcycle.

However, the vehicle 1 is not limited to the motorcycle, and may be a saddle riding vehicle also including vehicles other than the motorcycle, or a small vehicle also including vehicles other than the saddle riding vehicle. In addition, the present invention is preferably applied to a vehicle in which a situation occurs where the vehicle can take various travel positions in the width direction within the same lane. Therefore, a wide range of vehicles which may travel on a road surface that is wider than the vehicle width may be applied to the vehicle 1. Further, a vehicle other than a small vehicle may be applied to the vehicle 1, for example, a four-wheeled vehicle may be applied to the vehicle 1.

As illustrated in FIG. 1, the vehicle 1 includes, as a configuration related to the travel assistance device 10, a surrounding information acquisition unit 2 that acquires surrounding information of the vehicle 1, a vehicle-mounted sensor 3 that acquires information of the vehicle 1, and an operation unit 4 operated by the rider of the vehicle 1.

In the following description, the vehicle 1 equipped with the travel assistance device 10 will be referred to as the "host vehicle 1" as appropriate.

The surrounding information acquisition unit 2 includes a sensor device that acquires information that enables detection of another vehicle around the host vehicle 1. Objects detectable by the sensor device include at least other vehicles. The range detectable by the sensor device includes at least the left, right and rear of the host vehicle 1. The sensor device is at least one of, but not limited to, for example, radar, a lidar sensor, an ultrasonic sensor, and a camera. In the present embodiment, on the basis of the detection result of the sensor device, it is possible to identify the location of another vehicle with respect to the host vehicle 1, in addition to the presence of the other vehicle.

The processing for detecting the presence and location of another vehicle from the detection result of the sensor device may be performed on the surrounding information acquisition unit 2 side or on the travel assistance device 10 side. In addition, for each processing, known processing can be widely applied, except for processing related to detection points, which will be described later.

The vehicle-mounted sensor 3 include sensors that detect information related to the travel of the vehicle 1, such as vehicle speed and engine rotational speed (corresponding to power unit rotational speed). By using the information from the vehicle-mounted sensor, it is possible to identify whether the vehicle 1 is traveling or stopped, and whether or not the vehicle 1 is in operation (for example, with the ignition on).

The operation unit 4 includes a blinker operation unit 4A for operating a blinker that functions as a direction indicator installed in the vehicle 1. Generally, the rider of the vehicle 1 operates the blinker operation unit 4A to activate the blinker on the side corresponding to the lane change destination before changing lanes, and operates the blinker operation unit 4A so as to deactivate the blinker after the lane change.

For example, a push-cancel type blinker switch is used for the blinker operation unit 4A, but other types of blinker switches may be used. Note that the blinker operation unit 4A is an example of an operation unit to which operations intended for lane changing of the host vehicle 1 are input and an operation unit to which operations intended for terminating the lane change are input, and is not limited to the configuration of the present embodiment.

The travel assistance device 10 includes an information processing unit 11 consists of a processor that performs various types of information processing and a notification unit 12 that provides notification to the rider of the vehicle 1.

The information processing unit 11 includes a calculation unit 11A and a storage unit 11B. The calculation unit 11A is configured from a CPU including a processor or microcomputer and functions as a vehicle state detection unit 21, a detection range setting unit 22, and an object detection unit 23 by executing a control program stored in the storage unit 11B consists of a memory. The information processing unit 11 may be configured as a System-on-a-chip (SoC) integrating the calculation unit 11A and the storage unit 11B. The vehicle state detection unit 21, the detection range setting unit 22, and the object detection unit 23 are not limited to a configuration implemented by software, but may also be implemented by hardware.

The vehicle state detection unit 21 detects the state of the vehicle 1 from the detection result of the vehicle-mounted sensor 3. For example, the vehicle state detection unit 21 can identify whether the vehicle 1 is traveling or stopped on the basis of information such as vehicle speed, or whether the vehicle 1 is in operation (with the ignition on) on the basis of the operations of an ignition switch.

In addition, the vehicle state detection unit 21 has an operation detection unit 21A that detects the operations of the blinker operation unit 4A. By detecting at least the operations of the blinker operation unit 4A, the operation detection unit 21A is capable of detecting, through the blinker operations, an operation intended for lane changing of the host vehicle 1 and an operation intended to terminate the lane change.

The detection range setting unit 22 sets the detection range of an object corresponding to another vehicle around the host vehicle 1. The detection range setting unit 22 includes a detection area setting unit 22A that sets a detection area and a detection point setting unit 22B that sets a plurality of detection points.

The detection area is information indicating the detection range of another vehicle located in and around the blind spot to which the rider is desirably alerted with reference to the host vehicle 1. The detection points are set at intervals in the width direction of the road surface, and are the information indicating width positions within the above detection area.

The information for setting the detection area and the detection points may be either information stored in advance in the storage unit 11B or information described in the control program. Note that the detection points are an example of "detection range elements" according to the present invention, and the detection point setting unit 22B is an example of a "detection range element setting unit" according to the present invention.

The object detection unit 23 detects the presence of an object, which is another vehicle, and the location of the object, on the basis of the detection area and detection points set by the detection range setting unit 22. For example, the object detection unit 23 can identify the presence of another vehicle in the detection area and its location including the distance and direction to the other vehicle from reflected waves or the like detected by the sensor device of the surrounding information acquisition unit 2, or can identify the presence of another vehicle in the detection area and its location including the distance and direction to the other vehicle by performing image recognition of image data acquired by the sensor device. Processing related to detection points will be described later.

Figure 3:
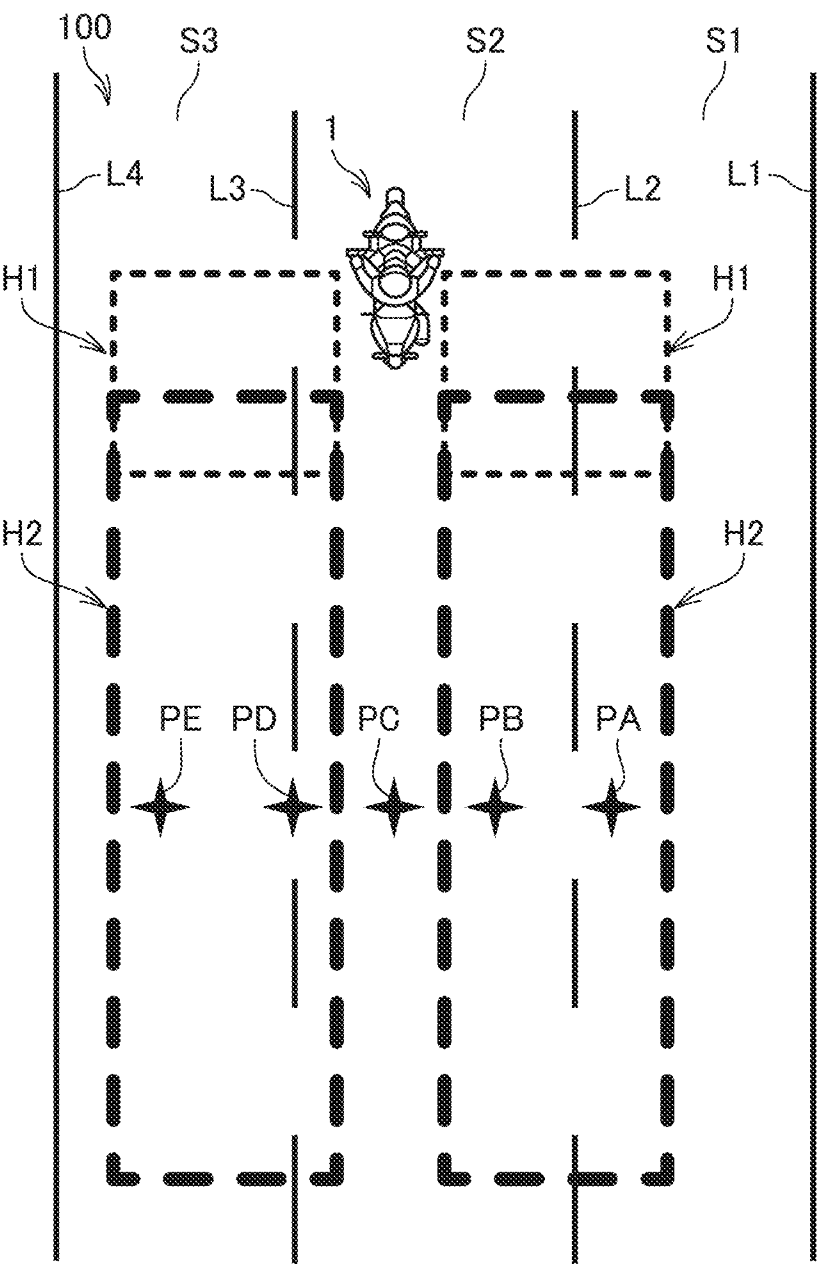
FIG. 3 schematically illustrates detection areas and detection points when a vehicle travels in a different position.
Figure 4:
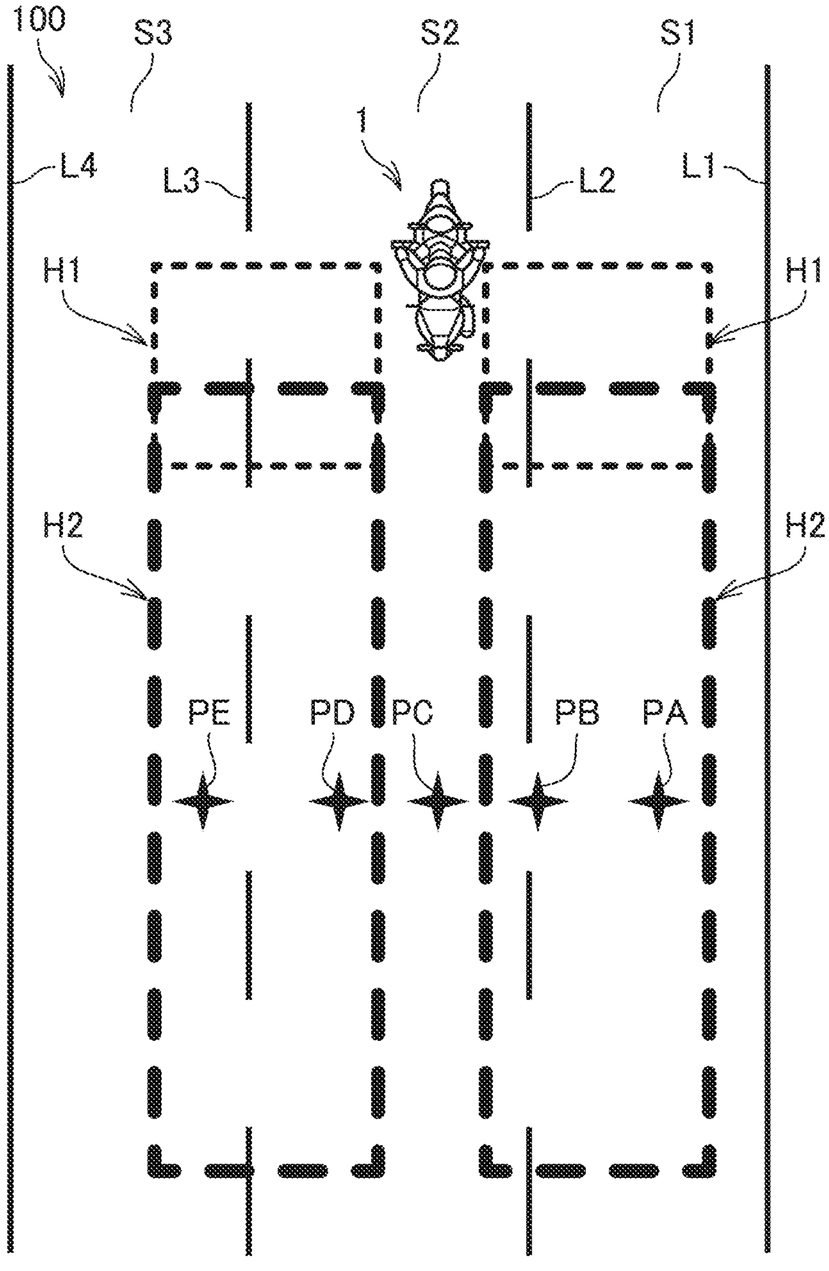
FIG. 4 schematically illustrates detection areas and detection points when the vehicle travels in a different position.

FIGS. 2 to 4 schematically illustrate detection areas and detection points.

FIG. 2 illustrates, from above, a situation where the vehicle 1 is traveling in the center lane of a road 100 with three lanes in one direction. The lanes of the road 100 are indicated as a first lane S1, a second lane S2, and a third lane S3. White lane lines L2 and L3 are provided between the lanes S1 and S3, and outside lines L1 and L4 are provided at the edges of the lanes S1 and S3 at both ends of the road 100.

If the operation of the blinker operation unit 4A corresponding to the operation intended for lane changing of the host vehicle 1 is not performed, the detection area setting unit 22A sets, as a detection area, a first detection area H1 along the sides toward the rear of the host vehicle 1, as illustrated in FIG. 2. In addition, if the operation of the blinker operation unit 4A corresponding to the operation intended for lane changing of the host vehicle 1 is performed, the detection area setting unit 22A sets a second detection area H2 along the sides toward the rear of the host vehicle 1.

If the host vehicle 1 does not change lanes, the first detection area H1 is set in the range of other vehicles in and around the blind spot to which the rider of the host vehicle 1 is desirably alerted.

If the host vehicle 1 changes lanes, the second detection area H2 is set in the range of other vehicles in and around the blind spot to which the rider of the host vehicle 1 is desirably alerted, and is set at least on the left or right side corresponding to the lane change destination. The second detection area H2 is set in an area at least longer rearward than the first detection area H1.

Each of the detection areas H1 and H2 illustrated in FIG. 2 is an example, but in the present embodiment, the first detection area H1 is set within the range where other vehicles traveling to the left, right, and near the rear of the host vehicle 1 can be detected.

In addition, the second detection area H2 is set within the range where other vehicles traveling behind the host vehicle 1 in the lane change destination can be detected. For the detection areas H1 and H2, the detection areas employed in known devices having BSI functions can be applied as appropriate.

The detection point setting unit 22B sets a plurality of detection points PA, PB, PC, PD, and PE spaced apart in the width direction of the road surface in a region along the sides toward the rear of the host vehicle 1. In the present embodiment, the five detection points PA to PE are set.

The detection point PA is a detection point located at the right rear of the host vehicle 1 and at the outermost side in the width direction, and is information indicating a width position that is closer to the outside in the width direction within the second detection area H2 on the right side.

The detection point PB is a detection point located at the right rear of the host vehicle 1 and further inward in the width direction than the detection point PA, and is information indicating a width position that is closer to the inside in the width direction within the second detection area H2 on the right side.

The detection point PC is located behind the left-right center of the host vehicle 1, and is information indicating a width position corresponding to the region between the left and right rear sides.

The detection point PD is a detection point located at the left rear of the host vehicle 1 and further inward in the width direction than the detection point PE, and is information indicating a width position that is closer to the inside in the width direction within the second detection area H2 on the left side.

The detection point PE is a detection point located at the left rear of the host vehicle 1 and at the outermost side in the width direction, and is information indicating a width position that is closer to the outside in the width direction within the second detection area H2 on the left side.

Each of the detection points PA to PE is a fixed position with respect to the host vehicle 1.

The detection points PA to PE in the present embodiment are set at positions that satisfy the following conditions. When the vehicle 1 is traveling in the left-right center of the lane S2, the detection point PA is located within the region of the first lane S1 adjacent to the right side, and the detection point PB is located within the same lane S2 as the vehicle 1, as illustrated in FIG. 2. The detection point PC is located on a vehicle width center LC. The detection points PE and PD are located at positions symmetrical to the detection points PA and PB with respect to the vehicle width center LC of the vehicle 1.

When the vehicle 1 is traveling closer to the left side of the lane S2, the detection point PA is located within the region of the first lane S1 adjacent to the right side, and the detection points PB and PC are located within the same lane S2 as the vehicle 1, as illustrated in FIG. 3. In addition, the detection points PD and PE are located within the lane S3 adjacent to the left side.

Furthermore, when the vehicle 1 is traveling closer to the right side of the lane S2, the detection points PA and PB are located within the region of the first lane S1 adjacent to the right side, and the detection point PD is located within the same lane S2 as the vehicle 1, as illustrated in FIG. 4. In addition, the detection point PE is located within the lane S3 adjacent to the left side.

Returning to FIG. 1, the notification unit 12 is a device that notifies the rider of the vehicle 1 of the presence of another vehicle, which is an object to be notified, on the basis of the output result of the object detection unit 23. The notification unit 12 includes at least one of a display device or voice output device provided in the vehicle 1, and notifies the presence of another vehicle by at least display or voice. For example, the display device of the notification unit 12 is provided in a meter unit arranged in the vehicle 1 and notifies the presence of another vehicle by turning on a predetermined indicator. In addition, for example, the voice output device of the notification unit 12 is provided in the meter unit or the like of the vehicle 1 and notifies the presence of another vehicle by outputting a predetermined warning sound. Note that the notification unit 12 is not limited to the display device and voice output device, and may be configured to transmit information via communication to a device carried by the rider and notify the rider from the device. Known notification devices can be widely applied to the notification unit 12.

Next, the operation of the travel assistance device 10 during a blinker operation will be described.

Figure 5:
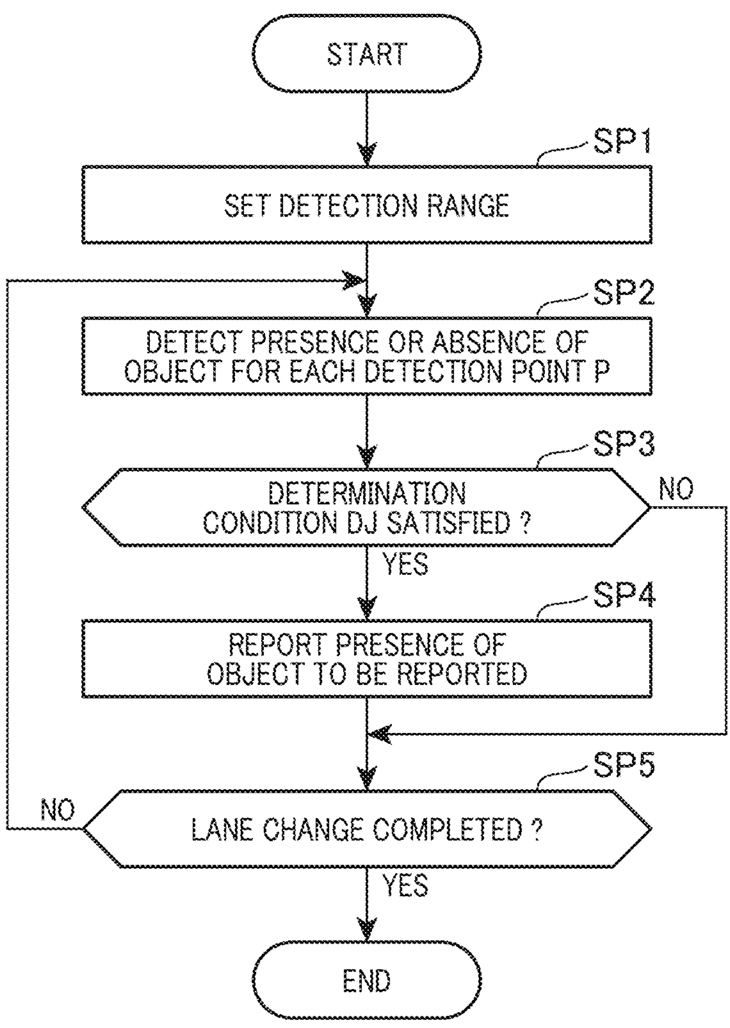
FIG. 5 is a flowchart illustrating the operation of the travel assistance device during a blinker operation.

FIG. 5 is a flowchart illustrating the operation of the travel assistance device 10 during a blinker operation. Note that the operation illustrated in FIG. 5 is repeatedly performed, for example, when a blinker operation corresponding to the operation intended for lane changing of the host vehicle 1 is detected by the operation detection unit 21A under a situation where the ignition on, engine start (power unit start), or the like of the vehicle 1 is detected by the vehicle state detection unit 21.

First, when the operation detection unit 21A detects a blinker operation corresponding to the operation intended for lane changing of the host vehicle 1, the travel assistance device 10 executes processing for setting a detection range by means of the detection range setting unit 22 (step SP1).

When a blinker operation corresponding to an operation intended to change lanes to the right side is detected in step SP1, the detection range setting unit 22 sets the detection area H2 (see FIGS. 2 to 4) on the right side and the detection points PA, PB, and PC (see FIGS. 2 to 4). In addition, when a blinker operation corresponding to an operation intended to change lanes to the left side is detected, the detection range setting unit 22 sets the detection area H2 (see FIGS. 2 to 4) on the left side and the detection points PE, PD, and PC (see FIGS. 2 to 4).

In the following description, the detection points PA to PE will simply be referred to as the "detection point P" if there is no need to distinguish therebetween.

Next, the travel assistance device 10 uses the object detection unit 23 to detect the presence or absence of an object corresponding to another vehicle for each of the set detection points P (step SP2). In this case, the object detection unit 23 detects the presence or absence of an object for each of the width positions corresponding to the set detection points P.

Next, the object detection unit 23 determines whether or not the detection results satisfy a predetermined determination condition DJ (step SP3). The determination condition DJ will be described later.

When the determination condition DJ is satisfied, the travel assistance device 10 executes processing for notifying the rider of the host vehicle 1 of the presence of another vehicle, which is an object to be notified, by means of the notification unit 12 (step SP4), and then proceeds to the processing of step SP5. Meanwhile, if the determination condition DJ is not satisfied, the travel assistance device 10 does not execute the notification processing and proceeds to the processing of step SP5.

In the processing of step SP5, the travel assistance device 10 determines whether or not a blinker operation corresponding to an operation intended for terminating the lane change of the vehicle 1 has been detected by the operation detection unit 21A, and if not detected (step SP5: NO), the process proceeds to the processing of step SP2. As a result, the processing of steps SP2 to S5 is repeated until the operation intended for terminating the lane change is performed.

In contrast, if a blinker operation corresponding to an operation intended for terminating the lane change are detected (step SP5: YES), the travel assistance device 10 terminates the operation illustrated in FIG. 5.

The processing of steps SP2 to SP4 will be described in detail with reference to FIGS. 6 to 9.

Figure 6:
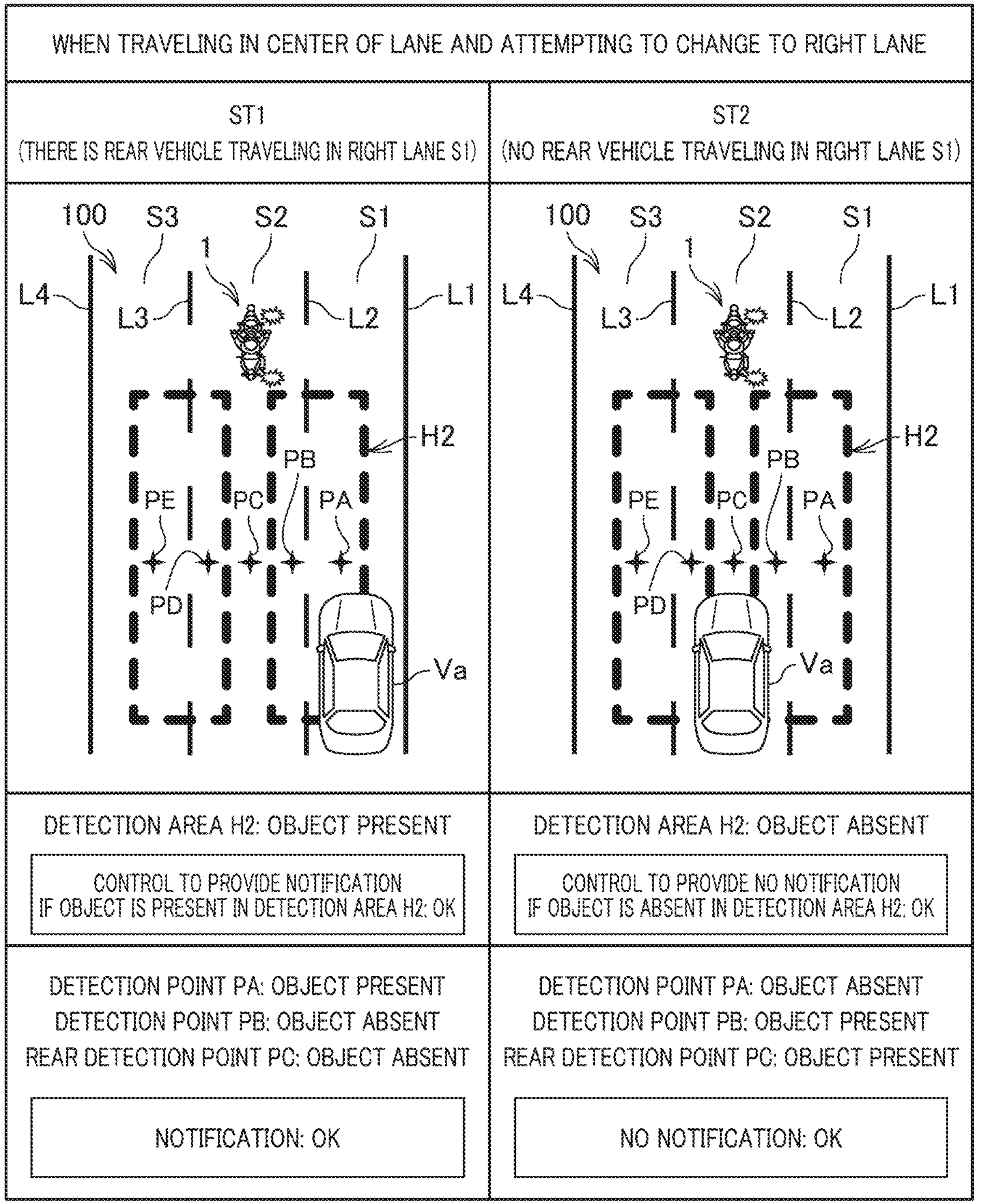
FIG. 6 is a view providing an explanation of the processing of steps SP2 to SP4 in FIG. 5.

FIG. 6 illustrates a case in which the vehicle 1 travels in the left-right center of the second lane S2 and changes lanes to the first lane S1, which corresponds to the right lane. The left side of FIG. 6 illustrates a first situation ST1 where the other vehicle Va is present in the first lane S1, which is the lane change destination. The right side of FIG. 6 illustrates a second situation ST2 where the other vehicle Va is present in the same second lane S2 as the vehicle 1. Note that the other vehicle Va is a four-wheeled vehicle.

The other vehicle Va in the first situation ST1 is a rear vehicle traveling in a position corresponding to a region along the sides toward the rear of the host vehicle 1, and it is desirable to notify the rider of the host vehicle 1 of the presence of the other vehicle Va when changing lanes.

Meanwhile, the other vehicle Va in the second situation ST2 is a rear vehicle (which can also be called a following vehicle) traveling in the same lane as the host vehicle 1, and it is desirable to avoid notifying the rider of the host vehicle 1 of the presence of the other vehicle Va when changing lanes.

In the case of the first situation ST1, as illustrated in FIG. 6, the object detection unit 23 detects that the object being the other vehicle Va is present at the width position corresponding to the detection point PA on the outside in the width direction (corresponding to "DETECTION POINT PA: OBJECT PRESENT" in FIG. 6) and that the object being the other vehicle Va is absent at the width position corresponding to the detection point PB on the inside in the width direction (corresponding to "DETECTION POINT PB: OBJECT ABSENT" in FIG. 6). The object detection unit 23 also detects that the object being the other vehicle Va is absent at the width position corresponding to the detection point PC directly behind the vehicle 1 (corresponding to "DETECTION POINT PC: OBJECT ABSENT" in FIG. 6).

The determination condition DJ describes the conditions under which the detected object is regarded as an object to be notified.

Specifically, the determination condition DJ describes, as conditions to be regarded as an object to be notified, the case where the object is present at the width position corresponding to the outermost detection point PA in the width direction on the right side ("DETECTION POINT PA: OBJECT PRESENT") and the case where the object is present at the width position corresponding to the outermost detection point PE in the width direction on the left side ("DETECTION POINT PE: OBJECT PRESENT").

In the case of the first situation ST1, since the determination condition DJ is satisfied, it is possible to appropriately notify the rider of the host vehicle 1 of the presence of the other vehicle Va, which is the rear vehicle in the lane change destination.

In the case of the second situation ST2, as illustrated in FIG. 6, the object detection unit 23 detects that the object being the other vehicle Va is absent at the width position corresponding to the detection point PA on the outside in the width direction (corresponding to "DETECTION POINT PA: OBJECT ABSENT" in FIG. 6) and that the object being the other vehicle Va is present at the width position corresponding to the detection point PB on the inside in the width direction (corresponding to "DETECTION POINT PB: OBJECT PRESENT" in FIG. 6). The object detection unit 23 also detects that the object being the other vehicle Va is present at the width position corresponding to the detection point PC directly behind the vehicle 1 ("DETECTION POINT PC: OBJECT PRESENT" in FIG. 6).

In the case of the second situation ST2, since the determination condition DJ is not satisfied, it is possible to avoid a situation where the rider of the vehicle 1 is notified of the presence of the other vehicle Va, which is not traveling in the lane change destination.

Note that similar results to the present embodiment can be obtained even if processing is applied to select whether or not to execute processing for notifying the rider of the host vehicle 1 of the presence of the other vehicle Va depending on the presence or absence of an object in the detection area H2.

In other words, in the case of the first situation ST1, it is possible to appropriately notify the rider of the host vehicle 1 of the presence of the other vehicle Va, which is the rear vehicle in the lane change destination, and in the case of the second situation ST2, it is possible to avoid a situation where the rider of the vehicle 1 is notified of the presence of the other vehicle Va, which is not traveling in the lane change destination.

FIG. 7 illustrates a case in which the vehicle 1 travels closer to the left side of the second lane S2 and changes lanes to the first lane S1, which corresponds to the right lane. The left side of FIG. 7 illustrates a third situation ST3 where the other vehicle Va being the rear vehicle is present in the first lane S1, which is the lane change destination. The right side of FIG. 7 illustrates a fourth situation ST4 where the other vehicle Va being the rear vehicle is present in the same second lane S2 as the vehicle 1.

In the case of the third situation ST3, as illustrated in FIG. 7, the object detection unit 23 detects that the object being the other vehicle Va is present at the width position corresponding to the detection point PA ("DETECTION POINT PA: OBJECT PRESENT" in FIG. 7) and that the object being the other vehicle Va is absent at the width positions corresponding to the detection points PB and PC ("DETECTION POINT PB: OBJECT ABSENT" and "DETECTION POINT PC: OBJECT ABSENT" in FIG. 7).

In the case of the third situation ST3, since the determination condition DJ is satisfied, it is possible to appropriately notify the rider of the host vehicle 1 of the presence of the other vehicle Va, which is the rear vehicle in the lane change destination.

Even if processing is applied to select whether or not to execute processing for notifying the rider of the host vehicle 1 of the presence of the other vehicle Va depending on the presence or absence of an object in the detection area H2, it is possible to appropriately notify the rider of the host vehicle 1 of the presence of the other vehicle Va, which is the rear vehicle in the lane change destination, similarly to the present embodiment.

In the case of the fourth situation ST4, as illustrated in FIG. 7, the object detection unit 23 detects that the object being the other vehicle Va is absent at the width position corresponding to the detection point PA ("DETECTION POINT PA: OBJECT ABSENT" in FIG. 7) and that the object being the other vehicle Va is present at the width positions corresponding to the detection points PB and PC ("DETECTION POINT PB: OBJECT PRESENT" and "DETECTION POINT PC: OBJECT PRESENT" in FIG. 7).

In the case of the fourth situation ST4, since the determination condition DJ is not satisfied, it is possible to avoid a situation where the rider of the host vehicle 1 is notified of the presence of the other vehicle Va, which is not traveling in the lane change destination.

By the way, in the fourth situation ST4, the other vehicle Va traveling in the same second lane S2 as the vehicle 1 is present in the second detection area H2, which is the lane change destination. Therefore, if processing is applied to select whether or not to execute processing for notifying the rider of the host vehicle 1 of the presence of the other vehicle Va depending on the presence or absence of an object in the detection area H2, a situation may arise where the rider of the host vehicle 1 is notified of the presence of the other vehicle Va traveling in the same second lane S2 as the vehicle 1, resulting in excessive notification.

Meanwhile, in the present embodiment, it is possible to avoid a situation where the presence of the other vehicle Va traveling in the same second lane S2 as the vehicle 1 is notified, so that excessive notification can be suppressed.

FIG. 8 illustrates a case in which the vehicle 1 travels closer to the right side of the second lane S2 and changes lanes to the first lane S1, which corresponds to the right lane. The left side of FIG. 8 illustrates a fifth situation ST5 where the other vehicle Va being the rear vehicle is present in the first lane S1, which is the lane change destination. The right side of FIG. 8 illustrates a sixth situation ST6 where the other vehicle Va being the rear vehicle is present in the same second lane S2 as the vehicle 1.

In the case of the fifth situation ST5, as illustrated in FIG. 8, the object detection unit 23 detects that the object being the other vehicle Va is present at the width position corresponding to the detection point PA ("DETECTION POINT PA: OBJECT PRESENT" in FIG. 8) and that the object being the other vehicle Va is absent at the width positions corresponding to the detection points PB and PC ("DETECTION POINT PB: OBJECT ABSENT" and "DETECTION POINT PC: OBJECT ABSENT" in FIG. 8).

In the case of the fifth situation ST5, since the determination condition DJ is satisfied, it is possible to appropriately notify the rider of the host vehicle 1 of the presence of the other vehicle Va in the lane change destination.

Even if processing is applied to select whether or not to execute processing for notifying the rider of the host vehicle 1 of the presence of the other vehicle Va depending on the presence or absence of an object in the detection area H2, it is possible to appropriately notify the rider of the host vehicle 1 of the presence of the other vehicle Va in the lane change destination, similarly to the present embodiment.

In the case of the sixth situation ST6, as illustrated in FIG. 8, the object detection unit 23 detects that the object being the other vehicle Va is absent at the width positions corresponding to the detection points PA and PB ("DETECTION POINT PA: OBJECT ABSENT" and "DETECTION POINT PB: OBJECT ABSENT" in FIG. 8) and that the object being the other vehicle Va is present at the width position corresponding to the detection point PC ("DETECTION POINT PC: OBJECT PRESENT" in FIG. 8).

In the case of the sixth situation ST6, since the determination condition DJ is not satisfied, it is possible to avoid a situation where the rider of the host vehicle 1 is notified of the presence of the other vehicle Va, which is not traveling in the lane change destination.

Even if processing is applied to select whether or not to execute processing for notifying the rider of the host vehicle 1 of the presence of the other vehicle Va depending on the presence or absence of an object in the detection area H2, it is possible to avoid a situation where the rider of the host vehicle 1 is notified of the presence of the other vehicle Va, which is not traveling in the lane change destination, similarly to the present embodiment.

Figure 9:
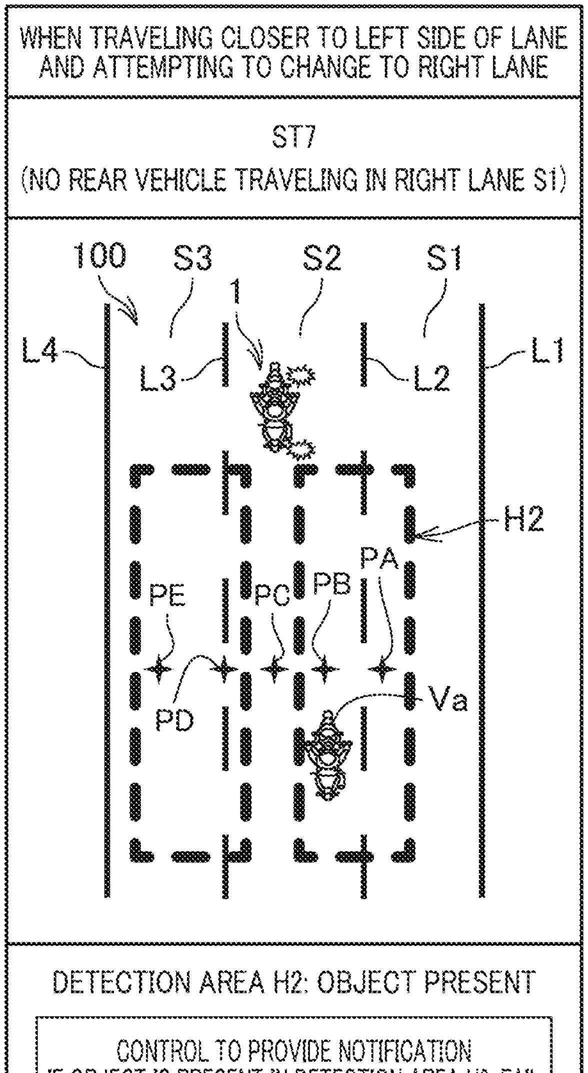
FIG. 9 is a view providing an explanation of the processing of steps SP2 to SP4 in FIG. 5.

FIG. 9 illustrates the seventh situation ST7 where the other vehicle Va is a motorcycle.

As illustrated in FIG. 9, if a plurality of motorcycles, which are the vehicle 1 and the other vehicle Va, travel in a front-to-rear spaced relation to each other, the motorcycles may travel out of alignment with each other to the left or right, in other words, in a staggered arrangement.

The seventh situation ST7 can be said to be a situation where the other vehicle Va has been replaced by a motorcycle, when compared to the fourth situation ST4.

In the case of the seventh situation ST7, as illustrated in FIG. 9, the object detection unit 23 detects that the object being the other vehicle Va is absent at the width position corresponding to the detection point PA ("DETECTION POINT PA: OBJECT ABSENT" in FIG. 9), the object being the other vehicle Va is present at the width position corresponding to the detection point PB ("DETECTION POINT PB: OBJECT PRESENT" in FIG. 9), and the object being the other vehicle Va is absent at the width position corresponding to the detection point PC ("DETECTION POINT PC: OBJECT ABSENT" in FIG. 9).

In the case of the seventh situation ST7, since the determination condition DJ is not satisfied, it is possible to avoid a situation where the rider of the host vehicle 1 is notified of the following motorcycle traveling in a staggered arrangement in the same second lane S2 as the host vehicle 1. In other words, it is possible to avoid a situation where the rider of the host vehicle 1 is notified of the presence of the other vehicle Va, which is not traveling in the lane change destination.

Also in the seventh situation ST7, as in the fourth situation ST4, the other vehicle Va being a motorcycle traveling in the same second lane S2 as the vehicle 1 is present in the second detection area H2, which is the lane change destination. Therefore, if processing is applied to select whether or not to execute processing for notifying the rider of the host vehicle 1 of the presence of the other vehicle Va depending on the presence or absence of an object in the detection area H2, a situation may arise where the rider of the host vehicle 1 is notified of the following motorcycle traveling in a staggered arrangement in the same second lane S2 as the host vehicle 1, resulting in excessive notification.

Meanwhile, in the present embodiment, it is possible to avoid a situation where the presence of the other vehicle Va being a motorcycle traveling in a staggered arrangement in the same second lane S2 as the host vehicle 1 is notified, so that excessive notification can be suppressed.

Note that FIGS. 6 to 9 illustrate the case where the vehicle 1 changes lanes to the first lane S1 corresponding to the right lane, while the situation is symmetrical with that illustrated in FIGS. 6 to 9 above when the vehicle 1 changes lanes to the third lane S3 corresponding to the left lane. In addition, the object detection unit 23 detects the presence or absence of an object for each of the width positions corresponding to the detection point PE on the outside in the width direction, the detection point PD on the inside in the width direction, and the detection point PC, and if the determination condition DJ is satisfied on the basis of the detection results, the presence of the other vehicle Va is notified.

Therefore, even in a situation symmetrical to FIGS. 6 to 9 above, it is possible to appropriately notify the rider of the host vehicle 1 of the presence of the other vehicle Va, which is the rear vehicle in the lane change destination, and it is possible to avoid a situation where the rider of the host vehicle 1 is notified of the presence of the other vehicle Va, which is not traveling in the lane change destination.

Note that the present embodiment exemplifies the case where if the determination condition DJ is satisfied, the detected object is regarded as an object to be notified, but is not limited thereto. Information describing whether or not the detected object is regarded as an object to be notified may be stored for each combination of detection results as to the presence or absence of an object for each of the width positions corresponding to the detection points PA to PE, and on the basis of this information, if the detected object is regarded as an object to be notified, processing for notifying may be performed, and if the detected object is not regarded as an object to be notified, no processing for notifying may be performed.

Specifically, in addition to combinations of cases where the detected object is regarded as an object to be notified, the information may describe combinations of cases where the detected object is not regarded as an object to be notified (combinations of cases where notifying is not performed as described in FIGS. 6 to 9), and on the basis of this information, whether to notify or not to notify may be selected.

As described above, the travel assistance device 10 according to the present embodiment includes: the detection point setting unit 22B that sets the plurality of detection points P aligned in the width direction in a region along the sides toward the rear of the host vehicle 1; the object detection unit 23 that detects the presence or absence of an object for each of the width positions corresponding to the detection points P; and the notification unit 12 that notifies the presence of the object if the object is determined to be an object to be notified on the basis of the detection result of the object detection unit 23. Thus, in the vehicle 1 that can take various travel positions in the width direction within the same lane, it is possible to avoid a situation where the presence of a rear vehicle traveling in the same lane is notified, and to suppress excessive notification.

In addition, the object detection unit 23 detects the presence or absence of an object for each of the width positions corresponding to the detection points P, and determines that the object is an object to be notified if the detection results satisfy the determination condition DJ serving as predetermined conditions. Therefore, through simple processing, it is possible to determine whether or not the object is an object to be notified. Furthermore, by setting the determination condition DJ appropriately as described above, it is possible to appropriately notify the rider of the host vehicle 1 of the presence of the other vehicle Va, which is a rear vehicle in the lane change destination, and it is possible to avoid a situation where the rider of the host vehicle 1 is notified of the presence of the other vehicle Va, which is not traveling in the lane change destination.

In this case, if the object is present at the width position corresponding to the outermost detection point PA or PE in the width direction among the plurality of detection points P, the object detection unit 23 determines that the object is an object to be notified. Therefore, it is possible to appropriately notify the rider of the host vehicle 1 of the presence of the other vehicle Va, which is a rear vehicle in the adjacent lane.

In addition, if the object is absent at the width position corresponding to the outermost detection point PA or PE in the width direction among the plurality of detection points P and the object is present at the width position corresponding to the innermost detection point PB or PD in the width direction, the object detection unit 23 determines that the object is not an object to be notified. Therefore, it is possible to appropriately avoid a situation where the rider of the host vehicle 1 is notified of the presence of the other vehicle Va, which is not traveling in the adjacent lane.

Further, the detection point setting unit 22B sets the detection point PC serving as a rear detection point behind the left-right center of the host vehicle 1, and if the object is present at the width position corresponding to the detection point PC, the object detection unit 23 determines that the object is not an object to be notified. Therefore, it is possible to appropriately avoid a situation where the rider of the host vehicle 1 is notified of the presence of the other vehicle Va, which is not traveling in the adjacent lane. Note that the rear detection point is an example of a "rear detection range element" according to the present invention.

In addition, when an operation intended for lane changing of the host vehicle 1 is performed, the detection point setting unit 22B sets the detection points P. Therefore, when changing lanes, it is possible to appropriately notify the rider of the host vehicle 1 of the presence of the other vehicle Va, which is a rear vehicle in the lane change destination, and to avoid a situation where the presence of a rear vehicle traveling in the same lane is notified, thereby suppressing excessive notification.

Note that when an operation intended for lane changing of the host vehicle 1 is performed, the object detection unit 23 may detect the presence or absence of an object for each of the width positions corresponding to the detection points P set by the detection point setting unit 22B. For example, when an operation intended for lane changing of the host vehicle 1 is performed, whether or not to detect at the detection points P that have already been set may be switched.

In addition, when an operation intended for lane changing of the host vehicle 1 is performed, the notification unit 12 may notify the presence of the object on the basis of the detection results of the object detection unit 23. For example, when an operation intended for lane changing of the host vehicle 1 is performed, whether or not to notify the presence of the object on the basis of the detection results of the object detection unit 23 may be switched.

In either case, when changing lanes, it is easier to appropriately notify the rider of the host vehicle 1 of the presence of the other vehicle Va, which is a rear vehicle in the lane change destination, and to avoid a situation where the presence of a rear vehicle traveling in the same lane is notified, thereby suppressing excessive notification.

Moreover, if the host vehicle 1 is traveling in the left-right center of a lane (for example, the second lane S2) and in a position within the lane (for example, the second lane S2) deviating to the left or right side from the left-right center, the outermost detection point PA or PE in the width direction among the plurality of detection points P is located within the other lane (for example, the first lane S1 or the third lane S3) adjacent to the outside of the lane (for example, the second lane S2) in the width direction, and if the host vehicle 1 is traveling in the left-right center of a lane (for example, the second lane S2) and in a position within the lane (for example, the second lane S2) deviating to the left or right side from the left-right center, the innermost detection point PB or PD in the width direction is located within the lane (for example, the second lane S2).

Thus, even if the host vehicle 1 travels in various travel positions in the width direction within the same lane (for example, the second lane S2), the other vehicle Va, which is a rear vehicle traveling in the adjacent lane (for example, the first lane S1 or the third lane S3), and the other vehicle Va (including a motorcycle traveling in a staggered arrangement relative to the host vehicle 1), which is a rear vehicle traveling in the same lane as the host vehicle 1, can be identified with high accuracy, so that excessive notification can be effectively suppressed.

Furthermore, since the host vehicle 1 is a saddle riding vehicle such as a motorcycle, it is possible to avoid a situation where the presence of a rear vehicle traveling in the same lane is notified to the saddle riding vehicle that can travel in various travel positions in the width direction within the same lane, and to provide the travel assistance device 10 that can suppress excessive notification.

In addition, the vehicle 1 being a saddle riding vehicle includes the travel assistance device 10 and the operation unit 4 that receives an operation intended for lane changing. The detection point setting unit 22B of the travel assistance device 10 sets the detection points P when the operation unit 4 is operated. Therefore, it is possible to provide a saddle riding vehicle that can appropriately notify the rider of the host vehicle 1 of the presence of the other vehicle Va, which is a rear vehicle in the lane change destination, when changing lanes, and also avoid a situation where the presence of a rear vehicle traveling in the same lane is notified, thereby suppressing excessive notification.

The above-described embodiment merely shows one aspect of the present invention, the present invention is not limited to the above embodiment, and the detailed configuration thereof may be appropriately changed.

For example, the above embodiment describes a case in which both the detection area H2 and the detection points PA to PE are set, but the present invention is not limited thereto, and the setting of the detection area H2 may be omitted. In short, the present invention is only required to set the plurality of detection points PA to PE that are spaced apart in the width direction, detect the presence or absence of an object for each of the width positions corresponding to the detection points PA to PE, and notify the presence of the object if the object is determined to be an object to be notified on the basis of these detection results.

Furthermore, in the above embodiment, the case where the five detection points PA to PE are set as examples of detection range elements according to the present invention has been described, but the number, position, and shape of the detection range elements may be changed as appropriate to the extent that excessive notification can be suppressed. Each of the detection range elements is not limited to information indicating a point, but may be information specifying a wider range of width than a point, for example, it may be a line-shaped region extending in the front-rear direction of the vehicle, or a circle or oval region.

Further, the plurality of detection range elements are not limited to being spaced apart, but may be adjacent to each other.

In addition, the positions of the detection range elements can also be made variable depending on the speed (vehicle speed) of the host vehicle. For example, if the vehicle speed is relatively high, the detection range elements may be set at a position relatively far from the host vehicle, and if the vehicle speed is relatively low, the detection range elements may be set at a position relatively close to the host vehicle. Note that preferably, the positions of the detection range elements are determined by considering the time required for contact between the host vehicle and another vehicle and the time required for human reaction (for example, the time required to avoid contact), which are calculated from the vehicle speed and distance.

Configurations Supported by the Embodiments Described Above

The embodiments described above support following configurations.

Configuration 1

A travel assistance device includes: a detection range element setting unit that sets a plurality of detection range elements aligned in a width direction in a region along sides toward a rear of a host vehicle; an object detection unit that detects presence or absence of an object for each of width positions corresponding to the detection range elements; and a notification unit that notifies the presence of the object when the object is determined to be an object to be notified on the basis of detection results of the object detection unit.

With this configuration, excessive notification can be suppressed even if the vehicle can take various travel positions in the width direction within the same lane.

Configuration 2

In the travel assistance device according to Configuration 1, the object detection unit detects the presence or absence of the object for each of the width positions corresponding to each of the detection range elements, and determines that the object is an object to be notified when the detection results satisfy predetermined conditions.

With this configuration, it is possible to determine through simple processing whether the object is the object to be notified.

Configuration 3

In the travel assistance device according to Configuration 1 or 2, when the object is present at the width position corresponding to an outermost detection range element in the width direction among the plurality of detection range elements, the object detection unit determines that the object is the object to be notified.

With this configuration, it is possible to appropriately notify the rider of the host vehicle of the presence of the other vehicle, which is a rear vehicle in the adjacent lane.

Configuration 4

In the travel assistance device according to any one of Configurations 1 through 3, when the object is absent at the width position corresponding to the outermost detection range element in the width direction among the plurality of detection range elements and the object is present at the width position corresponding to an innermost detection range element in the width direction, the object detection unit determines that the object is not the object to be notified.

With this configuration, it is possible to appropriately avoid a situation where the rider of the host vehicle is notified of the presence of the other vehicle, which is not traveling in the adjacent lane.

Configuration 5

In the travel assistance device according to any one of Configurations 1 through 4, the detection range element setting unit sets a rear detection range element behind a left-right center of the host vehicle, and when the object is present at the width position corresponding to the rear detection range element, the object detection unit determines that the object is not the object to be notified.

With this configuration, it is possible to appropriately avoid a situation where the rider of the host vehicle is notified of the presence of the other vehicle, which is not traveling in the adjacent lane.

Configuration 6

In the travel assistance device according to any one of Configurations 1 through 5, when an operation intended for lane changing of the host vehicle is performed, the detection range element setting unit sets the detection range elements.

With this configuration, when changing lanes, it is possible to appropriately notify the rider of the host vehicle of the presence of the other vehicle, which is a rear vehicle in the lane change destination, and to avoid a situation where the presence of a rear vehicle traveling in the same lane is notified, thereby suppressing excessive notification.

Configuration 7

In the travel assistance device according to any one of Configurations 1 through 5, when an operation intended for lane changing of the host vehicle is performed, the object detection unit detects the presence or absence of the object for each of the width positions corresponding to the detection range elements set by the detection range element setting unit.

With this configuration, when changing lanes, it is easier to appropriately notify the rider of the host vehicle of the presence of the other vehicle, which is a rear vehicle in the lane change destination, and is easier to avoid a situation where the presence of a rear vehicle traveling in the same lane is notified, thereby suppressing excessive notification.

Configuration 8

In the travel assistance device according to any one of Configurations 1 through 5, when an operation intended for lane changing of the host vehicle is performed, the notification unit notifies the presence of the object on the basis of the detection results of the object detection unit.

With this configuration, when changing lanes, it is easier to appropriately notify the rider of the host vehicle of the presence of the other vehicle, which is the rear vehicle in the lane change destination, and is easier to avoid a situation where the presence of a rear vehicle traveling in the same lane is notified, thereby suppressing excessive notification.

Configuration 9

In the travel assistance device according to any one of Configurations 1 through 8, when the host vehicle is traveling in a left-right center of the lane and in a position deviating to a left or right side from the left-right center within the lane, the outermost detection range element in the width direction among the plurality of detection range elements is located within the other lane adjacent to the outside of the lane in the width direction, and when the host vehicle is traveling in the left-right center of the lane and in a position deviating to a left or right side from the left-right center within the lane, the innermost detection range element in the width direction is located within the lane.

With this configuration, even if the host vehicle travels in various travel positions in the width direction within the same lane, the other vehicle behind traveling in the adjacent lane, and the other vehicle traveling in the same lane as the host vehicle can be identified with high accuracy, so that excessive notification can be effectively suppressed.

Configuration 10

In the travel assistance device according to any one of Configurations 1 through 9, the host vehicle is a saddle riding vehicle.

With this configuration, it is possible to avoid a situation where the presence of a rear vehicle traveling in the same lane is notified to the saddle riding vehicle that can travel in various travel positions in the width direction within the same lane, and to provide the travel assistance device that can suppress excessive notification.

Configuration 11

A saddle riding vehicle includes: the travel assistance device according to any one of Configurations 1 to 10; and an operation unit that receives an operation intended for lane changing. In the saddle riding vehicle, the detection range element setting unit sets the detection range elements when the operation unit is operated.

With this configuration, it is possible to provide the saddle riding vehicle that can appropriately notify the rider of the host vehicle of the presence of the other vehicle, which is the rear vehicle in the lane change destination, when changing lanes, and also avoid a situation where the presence of the rear vehicle traveling in the same lane is notified, thereby suppressing excessive notification.

REFERENCE SIGNS LIST

1: vehicle (saddle riding vehicle)
2: surrounding information acquisition unit
3: vehicle-mounted sensor
4: operation unit
4A: blinker operation unit
10: travel assistance device
11: information processing unit
11A: calculation unit
11B: storage unit
12: notification unit
21: vehicle state detection unit
21A: operation detection unit
22: detection range setting unit
22A: detection area setting unit
22B: detection point setting unit (detection range element setting unit)
23: object detection unit
100: road
H1, H2: detection area
PA, PB, PD, PE: detection point (detection range element)

PC: detection point (rear detection point (rear range element))

S1 to S3: lane

DJ: determination condition

What is claimed is:

1. A travel assistance device comprising:

a detection area setting unit that sets a first detection area along sides toward a rear of a host vehicle and that sets a second detection area along the sides toward the rear of the host vehicle when operation of a blinker operation unit corresponding to operation intended for lane changing of the host vehicle is performed, the second detection area being longer rearward than the first detection area;

a detection point setting unit that sets a plurality of detection points which are aligned at intervals in a width direction of a road surface on which the host vehicle travels, which are information indicating a width position within the detection area set, and which includes a detection point on an inside in the width direction and a detection point on an outside in the width direction, the detection point on the inside in the width direction being located within a same lane as the host vehicle, the detection point on the outside in the width direction being located in a lane adjacent to a lane of the host vehicle;

an object detection unit that detects presence or absence of an object for each of width positions corresponding to the detection points; and a notification unit that notifies the presence of the object when the object is determined to be an object to be notified on the basis of detection results of the object detection unit:

when the operation of the blinker operation unit is performed, when the object is absent at the width position corresponding to the detection point on the outside in the width direction among the plurality of detection points, the detection point on the outside in the width direction being located in a lane change destination and when the object is present at the width position corresponding to the detection point on the inside in the width direction, the detection point on the inside in the width direction being located in the lane change destination, the object detection unit determines that the object is not the object to be notified.

2. The travel assistance device according to claim 1, wherein when the host vehicle is traveling in a position deviating to a left or right side from a left-right center within a lane, an outermost detection point in the width direction among the plurality of detection points is located within an other lane adjacent to an outside of the lane in the width direction, and when the host vehicle is traveling in the position deviating to the left or right side from the left-right center within the lane, an innermost detection point in the width direction is located within the lane.

3. The travel assistance device according to claim 1, wherein the host vehicle is a saddle riding vehicle.

4. A travel assistance device comprising:

a detection point setting unit that sets a plurality of detection points aligned in a width direction in a region along sides toward a rear of a host vehicle;

an object detection unit that detects presence or absence of an object for each of width positions corresponding to the detection points; and a notification unit that notifies the presence of the object when the object is determined to be an object to be notified based upon detection results of the object detection unit;

the detection point setting unit sets a rear detection point behind a left-right center of the host vehicle, and when the object is present at the width position corresponding to the rear detection point, the object detection unit determines that the object is not the object to be notified.

5. A saddle riding vehicle comprising:

the travel assistance device according to claim 4; wherein the detection point setting unit sets the detection points when operation of a blinker operation unit corresponding to operation intended for lane changing of the host vehicle is operated.

6. The travel assistance device according to claim 4, wherein when the host vehicle is traveling and in a position deviating to a left or right side from a left-right center within a lane, an outermost detection point in the width direction among the plurality of detection points is located within an other lane adjacent to an outside of the lane in the width direction, and when the host vehicle is traveling in the position deviating to the left or right side from the left-right center within the lane, an innermost detection point in the width direction is located within the lane.

* * * * *